(12) United States Patent
Michiwaki (10) Patent No.: US 9,429,928 B2
(45) Date of Patent: Aug. 30, 2016

(54) CONTROL METHOD, NON-TRANSITORY COMPUTER READABLE MEDIUM AND CONTROLLER OF NUMERICAL CONTROL MACHINE TOOL

(71) Applicant: MITUTOYO CORPORATION, Kanagawa (JP)

(72) Inventor: Hirokazu Michiwaki, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 423 days.

(21) Appl. No.: 13/921,681

(22) Filed: Jun. 19, 2013

(65) Prior Publication Data

US 2013/0345854 A1    Dec. 26, 2013

(30) Foreign Application Priority Data

Jun. 20, 2012    (JP) .................................. 2012-138838

(51) Int. Cl.
G05B 19/18         (2006.01)
G05B 19/4155       (2006.01)

(52) U.S. Cl.
CPC ........... G05B 19/18 (2013.01); G05B 19/4155 (2013.01); G05B 2219/36242 (2013.01); G05B 2219/37198 (2013.01)

(58) Field of Classification Search
None
See application file for complete search history.

(56) References Cited

U.S. PATENT DOCUMENTS

| 4,890,234 A | * | 12/1989 | Tanaka | G05B 19/408 318/568.1 |
| 2006/0058909 A1 | | 3/2006 | Jesse | |
| 2012/0109361 A1 | | 5/2012 | Chang et al. | |
| 2013/0282162 A1 | * | 10/2013 | Griggs | G05B 19/401 700/190 |

FOREIGN PATENT DOCUMENTS

EP    1637947    3/2006
JP    05-253800  10/1993

OTHER PUBLICATIONS

Search report from E.P.O., mail date is Oct. 22, 2013.

* cited by examiner

*Primary Examiner* — Sean Shechtman
*Assistant Examiner* — Steven Garland
(74) *Attorney, Agent, or Firm* — Greenblum & Bernstein, P.L.C.

(57) ABSTRACT

A method of controlling a numerical control machine tool, includes generating a flag which designates a kind of operation of the numerical control machine tool and an operating variable which is used for controlling the operation of the numerical control machine tool, based on an instruction used for controlling a three-dimensional measuring device different from the numerical control machine tool, storing the flag in a flag storage area and storing the operating variable in an operating variable storage area, selecting an operation to be executed by the numerical control machine tool by referring to a value of the flag stored in the flag storage area, and executing a control of the selected operation of the numerical control machine tool in accordance with a value of the operating variable stored in the operating variable storage area.

4 Claims, 6 Drawing Sheets

| | | VARIABLE NUMBER | | | WRITE→READ |
|---|---|---|---|---|---|
| | | COMPANY A | COMPANY B | COMPANY C | |
| OPERATION COMMAND | | VC180 | R80 | #903 | — |
| MOVING COORDINATE VALUE | X | VC181 | R81 | #900 | TERMINAL DEVICE →NC |
| | Y | VC182 | R82 | #901 | |
| | Z | VC183 | R83 | #902 | |
| MEASURED VALUE | X | VC184 | R84 | #904 | |
| | Y | VC185 | R85 | #905 | |
| | Z | VC186 | R86 | #906 | |
| PRESENT POSITION | X | — | — | #907 | NC→ TERMINAL DEVICE |
| | Y | — | — | #908 | |
| | Z | — | — | #909 | |
| | A | — | R87 | #910 | |
| | C | — | R88 | #911 | |
| MEASURING SPEED | | VC189 | R89 | #912 | TERMINAL DEVICE →NC |
| MOVING SPEED | | VC190 | R90 | #913 | |
| COORDINATE VALUE OF MOVEMENT START POINT | X | VC195 | R95 | #995 | NC |
| | Y | VC196 | R96 | #996 | |
| | Z | VC197 | R97 | #997 | |

FIG. 3B

| VALUE | OPERATION | WRITE→READ |
|---|---|---|
| 1 | POSITIONING | TERMINAL DEVICE →NC |
| 2 | MEASUREMENT | |
| 3 | A/C AXIS ROTATION | |
| 4 | B AXIS ROTATION | |
| 5 | COMPLETION OF OPERATION | NC→ TERMINAL DEVICE |
| 6 | ERROR MESSAGE | |
| 7 | COMPLETION OF NC PROGRAM | TERMINAL DEVICE →NC |

```
L101   N101(GOTO COMMAND)
L102   #995=#5041    ⎫
L103   #996=#5042    ⎬ STORE MOVEMENT START POINT
L104   #997=#5043    ⎭
L105   G31G90X#900Y#901Z#902F#913  POSITIONING AND MOVEMENT
L106   #990=ABS[#5041-[#900]]  ⎫   (PROTECTING MOVEMENT)
L107   #991=ABS[#5042-[#901]]  ⎪
L108   #992=ABS[#5043-[#902]]  ⎪
L109   #993=0.05               ⎪
L110   #994=#990+#991+#992     ⎬ RETURN ERROR
L111   IF[#994GT#993]GOTO40    ⎪ WHEN UNEXPECTED COLLISION
L112   #995=#900               ⎪ OCCURS
L113   #996=#901               ⎪
L114   #997=#902               ⎪
L115   #903=5                  ⎭
L116   GOTO100(GO BACK TO START MAIN LOOP)
```

220b

CONTROL METHOD, NON-TRANSITORY COMPUTER READABLE MEDIUM AND CONTROLLER OF NUMERICAL CONTROL MACHINE TOOL

CROSS-REFERENCE TO RELATED APPLICATION(S)

The present application claims the benefit of priority of Japanese Patent Application No. 2012-138838, filed on Jun. 20, 2012. The disclosures of this application are incorporated herein by reference.

BACKGROUND

1. Technical Field

The present invention relates to a control method, a computer readable medium and a controller of a numerical control machine tool.

2. Related Art

A technique is already known that a probe for a NC (numerical control) machine tool equivalent to a measuring probe used in a three-dimensional measuring device is attached to the NC machine tool to carry out a measurement on the NC machine tool (for instance, patent literature 1). Several makers which provide the probe for the NC machine tool also provide data processing software that executes a calculation process such as a geometric calculation in accordance with measurement data obtained by using the probe. They provide a system that realizes a measuring function on the NC machine tool by combining the above-described probe with the software. On the other hand, several makers which provide a CNC (Computerized numerical control) three-dimensional measuring device use a data processing program for the three-dimensional measuring device to create a measuring program of a series of measuring operations in the CNC three-dimensional measuring device from a CAD (Computer Aided Design) model, what is called a part program, then, convert the measuring program into a NC program for an NC controller of each NC machine tool and use the converted NC program to provide a system which can carry out a measurement on the NC machine tool. Systems similar to such a system which converts the measuring program created for the three-dimensional measuring device from the CAD model into the NC program are also widely realized in a CAM (Computer Aided Manufacturing) system.

However, in the related-art method, since a series of measuring programs such as the part program is converted into the NC program at one time, a partial measurement or an interactive measurement cannot be carried out, so that flexibility in measurement is low. Further, when a part program for a complicated measurement is made, the NC program data becomes a large capacity. Thus, since a defect position on the NC program is hardly specified when a defect occurs, it takes extremely much time to meet the defect and a maintenance property is deteriorated.

LITERATURE OF RELATED ART

Patent Literature

[Patent Literature 1] JP-A-5-253800

SUMMARY

Exemplary embodiments of the present invention provide a control method, a computer readable medium and a controller of a NC machine tool which can carry out a measurement on the NC machine tool in accordance with the same operation as that of a three-dimensional measuring device.

A method of controlling a numerical control machine tool, according to an exemplary embodiment of the invention, comprises:

generating a flag which designates a kind of operation of the numerical control machine tool and an operating variable which is used for controlling the operation of the numerical control machine tool, based on an instruction used for controlling a three-dimensional measuring device different from the numerical control machine tool;

storing the flag in a flag storage area and storing the operating variable in an operating variable storage area;

selecting an operation to be executed by the numerical control machine tool by referring to a value of the flag stored in the flag storage area; and executing a control of the selected operation of the numerical control machine tool in accordance with a value of the operating variable stored in the operating variable storage area.

A non-transitory computer readable medium storing a program causing a controller to execute a control process of a numerical control machine tool, according to an exemplary embodiment of the invention, the control process comprises:

a generating process that generates a flag which designates a kind of operation of the numerical control machine tool and an operating variable which is used for controlling the operation of the numerical control machine tool, based on an instruction used for controlling a three-dimensional measuring device different from the numerical control machine tool;

a storing process that stores the flag in a flag storage area and stores the operating variable in an operating variable storage area;

a selecting process that selects an operation to be executed by the numerical control machine tool by referring to a value of the flag stored in the flag storage area; and an executing process that executes a control of the selected operation of the numerical control machine tool in accordance with a value of the operating variable stored in the operating variable storage area.

A controller which controls a numerical control machine tool, according to an exemplary embodiment of the invention, comprises:

a generating module configured to generate a flag which designates a kind of operation of the numerical control machine tool and an operating variable which is used for controlling the operation of the numerical control machine tool, based on an instruction used for controlling a three-dimensional measuring device different from the numerical control machine tool;

a storing module configured to store the flag in a flag storage area and to store the operating variable in an operating variable storage area;

a selecting module configured to select an operation to be executed by the numerical control machine tool by referring to a value of the flag stored in the flag storage area; and an executing module configured to execute a control of the selected operation of the numerical control machine tool in accordance with a value of the operating variable stored in the operating variable storage area.

According to the present invention, a control method, a computer readable medium and a controller of a NC machine tool which can carry out a measurement on the NC machine tool in accordance with the same operation as that of a three-dimensional measuring device.

DETAILED DESCRIPTION

Now, by referring to the drawings, a control method, a computer readable medium and a controller of a NC machine tool according to an exemplary embodiment of the present invention will be described below.

[Summary of Three-Dimensional Measuring System]

Figure 1:
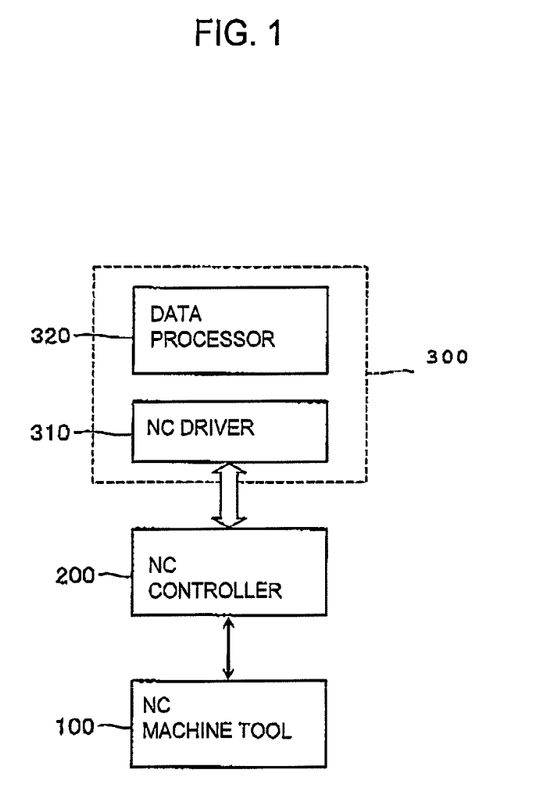
FIG. 1 is a view showing a summary of a three-dimensional measuring system according to an exemplary embodiment.

A summary of a three-dimensional measuring system using the control method, the control program or the controller according to the exemplary embodiment of the present invention will be described by referring to FIG. 1.

The three-dimensional measuring system includes a NC machine tool 100, a NC controller 200 which controls the NC machine tool 100, and a terminal device 300 which provides a user with an interface and sends/receives various kinds of data to/from the NC controller 200. In this system, a measuring probe is attached the NC machine tool 100 to carry out a three-dimensional measurement of a work by a measuring function on the NC machine tool 100.

Operation commands for a three-dimensional measuring device can be input through the terminal device 300. The terminal device 300 has a data processor 320 for the three-dimensional measuring device (hereinafter referred as a data processor). The data processor 320 issues an instruction for controlling the three-dimensional measuring device (hereinafter referred as "an instruction for a measuring device") or obtains a measured result from the three-dimensional measuring device (hereinafter referred as "data for a measuring device") to display the measured result on a screen. The terminal device 300 also has a NC driver 310 which allows the data processor 320 used for operations of the three-dimensional measuring device to link with the NC controller 200 for controlling the NC machine tool 100. With the use of the NC driver 310, a user who does not have a sufficient knowledge of the NC machine tool can carry out a measurement on the NC machine tool 100 as in the case of the three-dimensional measuring device, as described below.

The terminal device 300 may be installed in a position physically separated from the NC controller 200 and make a communication (for instance, RS-232C, TCP/IP or the like) through a cable with the NC controller 200. Further, when the NC controller 200 has a portion formed in the same way as an ordinary calculator for a front-end, a data processing program for the three-dimensional measuring device as the data processor 320 and the NC driver 310 may be built into this portion of the NC controller 200 and they internally communicates with the NC controller 200 through an API (Application Program Interface).

[NC Driver and NC Program]

The NC driver 310 and a NC program included in the NC controller 200 will be described.

Figure 2:
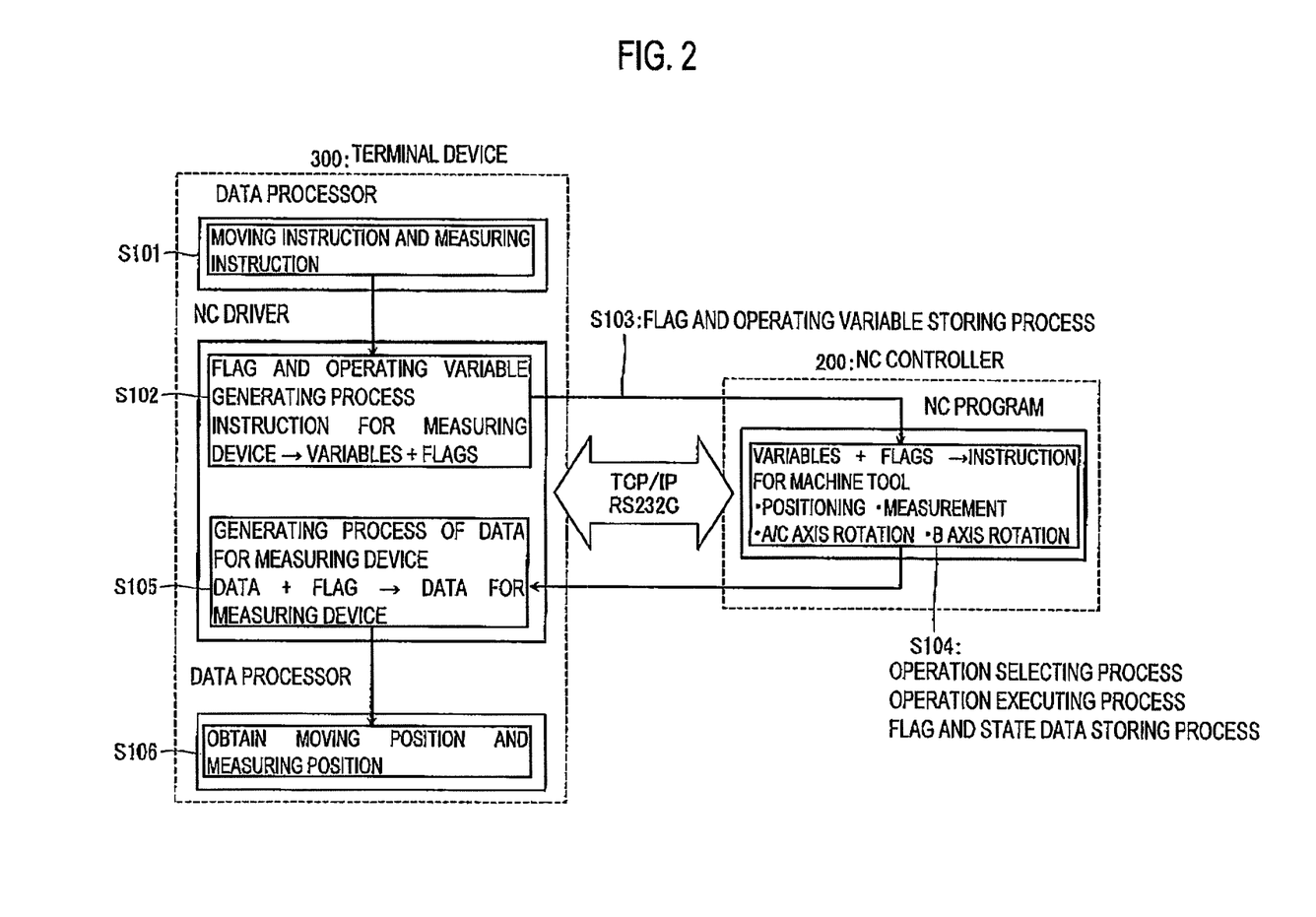
FIG. 2 is a view explaining an operation summary of the three-dimensional measuring system according to the exemplary embodiment.

FIG. 2 is a view for explaining an operation summary of the three-dimensional measuring system according to the exemplary embodiment. FIG. 2 shows the data processor 320 and the NC driver 310 of the terminal device 300 and the NC program of the NC controller 200.

Firstly, in step S101, the user operates a screen of the terminal device 300. Thus, the data processor 320 sends the instruction for the measuring device to the NC driver 310. Here, the instruction for the measuring device includes not only a simple instruction such as a movement of the probe, but also a relatively complicated instruction convenient for the three-dimensional measurement such as an automatic measurement of a hole of the work.

Subsequently, in step S102, the NC driver 310 which receives the instruction for the measuring device from the data processor 320 analyzes the instruction for the measuring device to separate the instruction into relatively simple operations, for instance, a positioning, a measurement, an A/C axis rotation, a B-axis rotation as shown in FIG. 2, which the NC machine tool 100 has. Then, the respective separated operations are sequentially converted into flags for selecting kinds of the operations and operating variables used for controlling the operations (a flag and operating variable generating process). The operating variables have formats which meet specifications of the NC controllers 200 and the NC machine tools 100 different respectively for makers of the NC machine tools 100.

Then, in step S103, the NC driver 310 stores the flags and the operating variables formed in the previous step S102 in storage areas such as predetermined registers which the NC program can read (a flag and operating variable storing process).

Figure 3A:
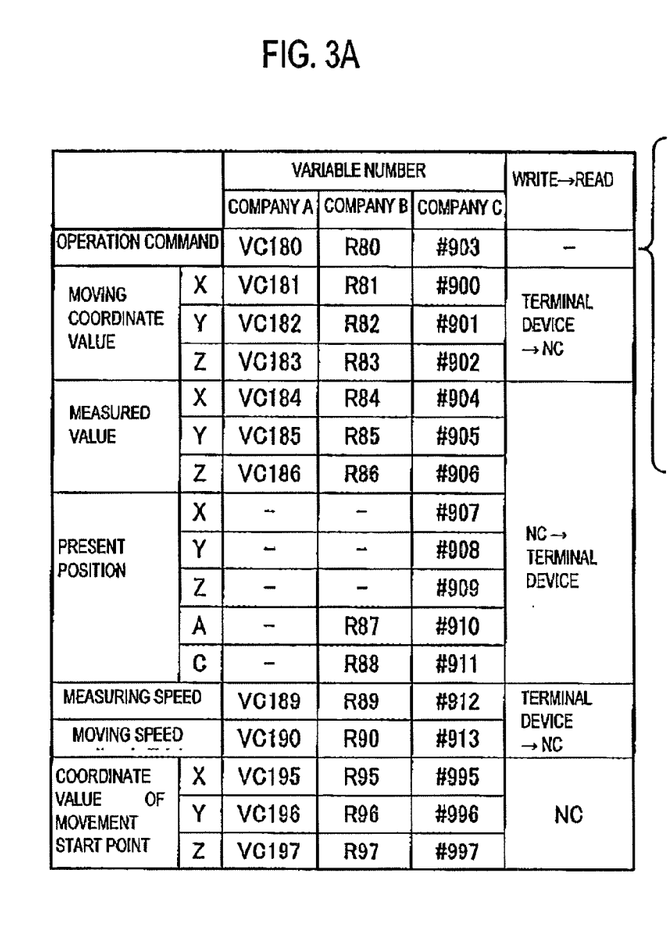
FIGS. 3A and 3B are views showing one example of storage areas of flags and operating variables of a NC program according to the exemplary embodiment.

FIG. 3A is a table showing one example of the storage areas of the flags and the operating variables to be referred in the NC program. In a below-described explanation, areas where the flags are stored are occasionally called flag storage areas and areas where the operating variables are stored are occasionally called operating variable storage areas.

As shown in FIG. 3A, the flag storage areas and the operating variable storage areas are different depending on the specifications of the NC programs respectively prepared by the makers. For instance, in the case of a company A, the flag storage area is designated by "VC 180" and the operating variable storage areas of a moving coordinate value are designated by "VC181" to "VC183". As compared therewith, in the case of a company B, the flag storage area is designated by "R80" and the operating variable storage areas of moving coordinate values are designated by "R81" to "R83".

Accordingly, the NC driver 310 needs to store the flags and the operating variables formed based on the instruction for the measuring device received from the data processor 320 in the proper flag storage areas and the operating variable storage areas which respectively meet the specifications of the NC programs of the makers.

A communication between the terminal device 300 and the NC controller 200 is carried out by, for instance, a TCP/IP or an RS-232C. This depends on the specification of the NC controller 200 of each of the makers. The NC driver 310 communicates with the NC controller 200 by using an API or a class module for a communication prepared by each of the makers.

Subsequently, in step S104, the NC program of the NC controller 200 refers to a value (flag) of the flag storage area to select the kind of the operation to be executed by the NC machine tool 100 in accordance with the value (an operation selecting process).

Figure 3B:
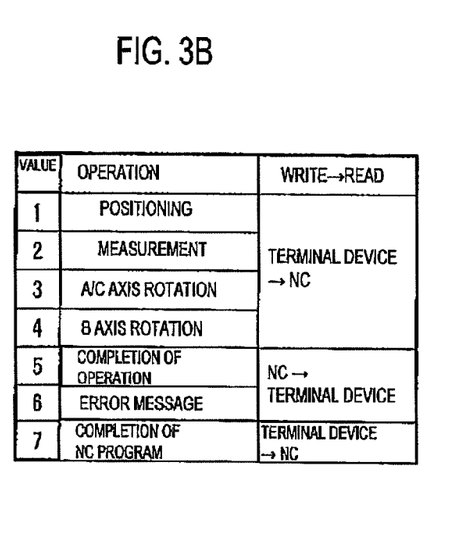

FIG. 3B is a table showing examples in which the values of the flags correspond to the kinds of the operations respectively. For instance, when the flag is "1", as the kind of the operation, the positioning of the probe is selected. When the flag is "2", as the kind of the operation, the measurement of the work is selected.

Then, the NC program operates the NC machine tool 100 in accordance with a processing routine prepared for each of the kinds of the operations by using the operating variables stored in the operating variable storage areas (an operation executing process). Since the operations are, as described above, the relatively simple and single operations such as the positioning of the probe, an execution of the measurement, the A/C axis rotation, the B-axis rotation or the like, the NC program of the NC controller 200 can be made to be simple and short. Thus, a labor necessary for programming the NC program can be more extremely reduced than a related-art case requiring a NC program like a batch process that executes an entire measurement path at a stroke. A routine process will be described below.

The NC controller 200 stores state data which varies in accordance with a state of the NC machine tool 100 in a previously prepared state data storage area as needed (a state data storing process).

Subsequently, in step S105, the NC driver 310 refers to the state data storage area of the NC controller 200. Then, the NC driver 310 converts the state data into a suitable measured value to generate data for the measuring device that can be read by the data processor 320 and sends the data for the measuring device to the data processor 320 (a generating process of data for measuring device).

Finally, in step S106, the data processor 320 calculates the various kinds of measured values of the work received from the NC driver 310 and outputs the calculated results through the screen provided in the terminal device 300 in the forms which can be used by the user.

Figure 4:
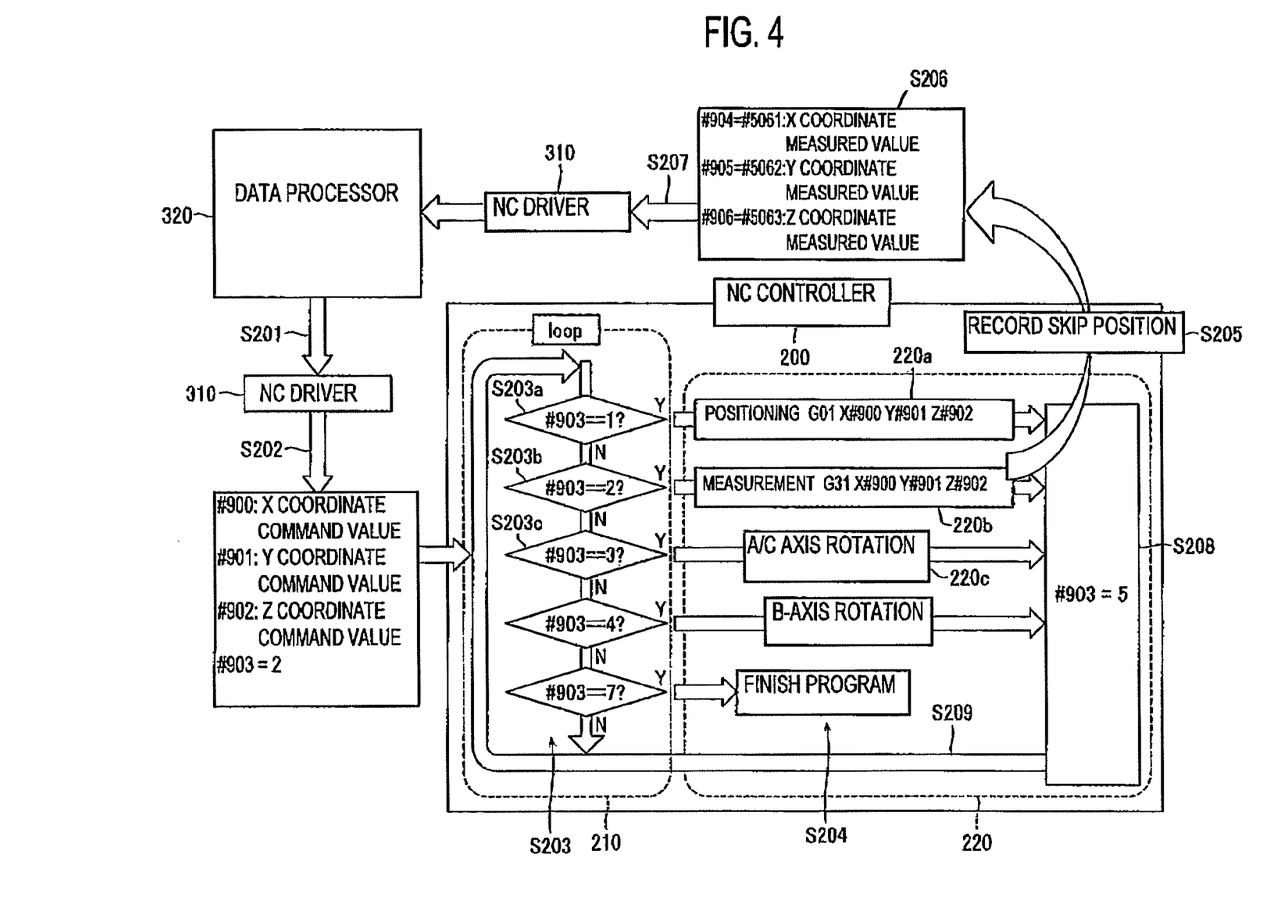
FIG. 4 is a view showing an example of the process in a NC driver and a NC controller according to the exemplary embodiment.

Now, a more detailed operation of the NC driver 310 and the NC program will be described by showing a specific example. FIG. 4 shows an example of the three-dimensional measuring system using the NC machine tool manufactured by a company C shown in FIG. 3. A below-described explanation is mainly given in accordance with specifications of the NC machine tool and the NC controller manufactured by the company C. However, the specifications thereof of the company C are merely a little different from those of the company A and the company B in designations of storage areas or NC codes. Basic structures of the NC driver and the NC program of the company C are not different from those of the companies A and B.

The NC program prepared for the NC controller 200 includes, as shown in FIG. 4, a flag processor 210 which determines kinds of operations to be executed by the NC machine tool and an operation executing module 220 which controls the determined operation in accordance with an operating variable.

In the flag processor 210, a determining process of a value of a flag is repeated by a loop. In the case of the company C, the determining process of the flag is performed by comparing a value of "#903" as a flag storage area with a value shown in FIG. 3B which shows the kind of the operation. Then, in accordance the kind of the operation determined herein, a process is moved to the processing routine for each of the kinds of the operations in the operation executing module 220.

Now, a flow of the above-described operations of the NC program will be sequentially described below. The kind of the operation treated herein is the execution of the measurement.

Initially, in step S201, the data processor 320 issues the instruction for the measuring device by operating the terminal device 300 by the user, and the NC driver 310 which receives the instruction for the measuring device issued form the data processor 320 carries out the flag and operating variable generating process.

Subsequently, in step S202, the NC driver 310 stores the value "2" of the flag showing the measurement in "#903" as the flag storage area and stores an X coordinate command value, a Y coordinate command value and a Z coordinate command value as the operating valuables in "#900", "#901" and "#902" as the operating valuable storage areas (the flag and operating valuable storing process).

Then, in step S203, the flag processor 210 of the NC program refers to "#903" as the flag storage area. Then, when "#903" indicates "1", namely, when the kind of the operation is the positioning of the probe, the process is moved to a processing routine 220*a* for the positioning in the operation executing module 220 (step S203*a*). Similarly, when "#903" indicates "3", namely, when the kind of the operation is the A/C axis rotation, the process is moved to a processing routine 220*c* for the A/C rotation in the operation executing module 220 (step S203*c*). In an example shown in FIG. 4, since "#903" indicates "2", the process is moved to a processing routine 220*b* for the execution of the measurement in the operation executing module 220 (step S203*b*).

Subsequently, in step S204, an instruction for the NC machine tool (hereinafter referred as an instruction for the machine tool) that is necessary for the measurement is issued in the processing routine 220*b* for the measurement in the operation executing module 220. In the example shown in FIG. 4, the measurement is carried out by using a block skip function ordinarily prepared for the NC machine tool.

Here, the block skip function will be briefly described below.

The block skip function means a function that when something comes into contact with the probe while the probe is moved to a predetermined position, a subsequent movement of the probe is stopped and a next process is executed.

Figure 5:
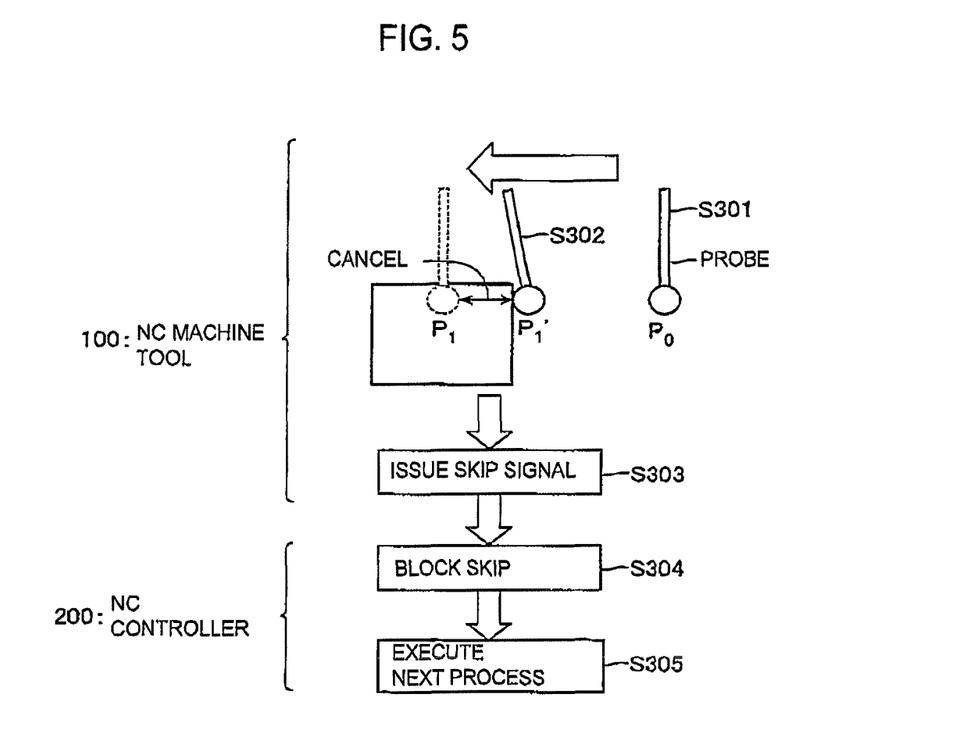
FIG. 5 is a view explaining a block skip function in the NC machine tool and the NC controller according to the exemplary embodiment.

FIG. 5 is a view for explaining a summary of the block skip function. The drawing shows an example that while the probe is moved from a position P0 to P1, the probe comes into contact with the work in a position P1'.

Before the block skip function is executed, the probe is moved to the position P0 by positioning (step S301).

Under this state, the NC program issues "G31 X(x1) Y(y1) Z(z1)" as the instruction for the machine tool of the block skip function to the NC machine tool 100. Here, G31 designates the NC code showing the block skip function. (x1), (y1) and (z1) are respectively values or variable names of an X coordinate, a Y coordinate and a Z coordinate for specifying the position P1. In accordance with the instruction for the machine tool, the probe starts to move from the position P0 to the position P1.

Then, in step S302, in the position P1', the work comes into contact with an end (a tip) of the probe. In this moment, the NC machine tool 100 (more specifically, a controller (not shown) for the probe) issues a skip signal to the NC controller 200 (step S303) and skips the movement of the probe from the position P1' to the position P1 (step S304).

After that, a next process is executed in the NC controller (step S305).

The summary of the block skip function is described above. When the measurement is carried out by the NC machine tool 100, a coordinate (the state data) of the position P1' where the skip signal is issued from the NC machine tool by using the block skip function is processed in the NC controller 200, so that the measurement can be simply realized.

Here, an explanation is returned to the operation of the NC driver 310 and the NC program.

In the step S204, the instruction for the machine tool of the block skip function is issued from the processing routine 220*b* of the operation executing module 220. Specifically, the instruction for the machine tool of the block skip function corresponds to "G31 X#900 Y #901 Z#902". Since in "#900", "#901" and "#902", a moving coordinate value of an x-axis, a moving coordinate value of a y-axis and a moving coordinate value of a z-axis are already stored by the NC driver 310, the measurement can be basically realized by the above-described program of one line.

Figure 6:
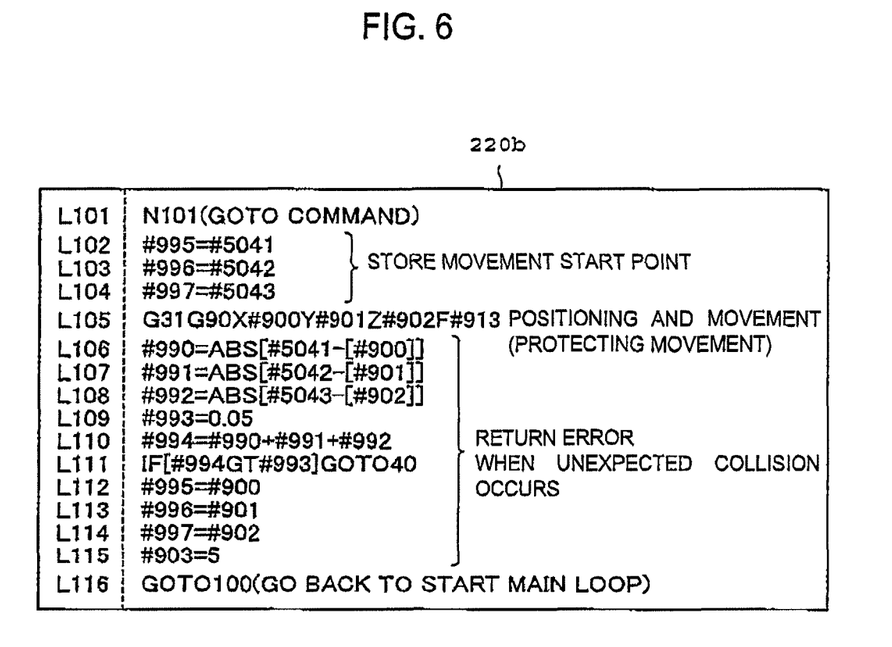
FIG. 6 is a view showing an example of program codes of a NC program according to the exemplary embodiment.

For instance, the processing routine 220*b* for the measurement can be realized by a short program as shown in FIG. 6.

The processing routine 220*b* is allowed to meet the specification of the NC controller 200 manufactured by the company C shown in FIG. 3. In FIG. 6, "#5041" to "#5043" designate the state data storage areas where a present position of the probe is stored. Further, "#995" to "#997" designate the state data storage areas where a coordinate of a movement start point of the probe is stored.

In L102 to L104, since the present position of the probe is set as the movement start point of the block skip function, values of "#5041" to "#5043" are stored in "#995" to "#997".

In L105, the block skip function is carried out that the coordinate designated by "#995" to "#997" is set as the movement start point and the probe is moved to a coordinate designated by "#900" to "#902".

L106 to L115 show an error process when an unexpected collision occurs in the probe and a detailed explanation thereof will be omitted.

As described above, in the case of an example shown in FIG. 6, the processing routine 220*b* for the measurement is simple, so that the processing routine does not have 20 lines at the most even by including the error process. This is also applied to the processing routines for other operations such as a movement or the A/C axis rotation. Namely, by the use of the NC driver 310, the user who has knowledge of the three-dimensional measuring device can relatively easily develop the NC program even if the user does not completely understand the control of the NC machine tool 100.

Subsequently, in step S205 in the course of the execution of the block skip function, when the probe comes into contact with the work, the NC machine tool 100 holds coordinate positions (state data) in, for instance, "#5061" to "#5063" and issues a skip signal to the NC controller 200. When the NC controller 200 receives the skip signal, the NC controller 200 stores the coordinate positions of the probe held in "#5061" to "#5063" in "#904" to "#906" as state data storage areas (step S206).

Then, in step S207, the NC driver 310 converts the state data of the coordinate positions stored in "#904" to "#906" as the state data storage areas into coordinate values (the data for the measuring device) which can be read by the data processor 320 and sends the coordinate values to the data processor 320.

When the processing routines of the NC program are respectively finished, the process is returned to the flag processor 210 (step S209). However, before the process is returned to the flag processor 210, as shown in L115 of FIG. 6, a value "5" showing a completion of the operations is stored in "#903" as the flag storage area. In this case, unless any of the values, such as "1" (the positioning of the probe), "2" (the measurement), 3 (the A/C-axis rotation), "4" (the B-axis rotation) and "7" (a completion of the NC program) is stored in "#903" from the NC driver 310, a loop process is repeated in the flag processor 210. Thus, the NC program can constantly check the change of the flag. Accordingly, when the NC driver 310 and the NC program of the exemplary embodiment are combined together, the three-dimensional measuring system can be realized which can process in real time with respect to the operation of the user in the terminal device 300.

In the related art, firstly, the data processing program for the three-dimensional measuring device is used to generate the data of the measurement path in the data processing program for the three-dimensional measuring device. Then, the data of the measurement path is converted into the NC program for the NC controller which meets each of the NC machine tools. Then, the NC program is used to realize the three-dimensional measurement by the NC machine tool.

However, in this case, the entire measurement path needs to be always executed. For instance, even when a part of the work is desired to be measured, the measurement path cannot be partly executed. Thus, a flexible measurement is difficult.

Further, for the NC controller, a complicated NC program which processes the entire measurement path needs to be prepared. Accordingly, the user who is familiar with the NC program as well as the user who does not have sufficient knowledge of the NC program requires extremely much time and labor to develop the complicated NC program.

Further, in the related-art method, when a defect occurs, it is not easy to specify a troubled position from a large quantity of NC data or the complicated NC program and a maintenance property is disadvantageously low.

In the case of the exemplary embodiment, the NC driver 310 converts each time the instruction for the measuring device issued from the data processor 320 into the flags and the operating variables which meet the specification of the NC controller 200. Further, in the NC program, the change of the flag is constantly monitored by the loop and the NC machine tool 100 is controlled each time in accordance with the change of the flag. Namely, the user operates the terminal device 300 so that the user may carry out a three-dimensional measurement by the NC machine tool 100 substantially in real time. As described above, in the exemplary embodiment, since a real time control is achieved by the operation of the user, an exceptional measurement intended by the user can be flexibly met, which is different from the related-art processing method like the batch process that a series of measurement paths are continuously executed.

Further, since the instruction for the measuring device can be realized only by combining the simple NC codes such as the positioning or the block skip function, the simple and short NC program may be prepared. Thus, a development cost of the NC program can be more greatly reduced than a related-art cost.

Further, by the use of the NC driver 310, for instance, a completed data processing program that the user employs in the related art when the user makes a three-dimensional measurement by the three-dimensional measuring device can be used as it is. In this case, even when the system has a defect, the defect part can be specified by a data process of the three-dimensional measuring device. Further, as described above, since the NC program itself is simple, the maintenance property can be more exceptionally improved than that of the related-art system.

What is claimed is:

1. A method of controlling a numerical control machine tool, comprising:

generating, based on an instruction for controlling a three-dimensional measuring device different from the numerical control machine tool, a flag which designates an operation type of the numerical control machine tool and an operating variable for controlling an operation of the numerical control machine tool;

storing the flag in a flag storage area of a memory and storing the operating variable in an operating variable storage area of the memory;

selecting an operation to be executed by the numerical control machine tool by referring to a value of the flag stored in the flag storage area of the memory; and executing a control of the selected operation of the numerical control machine tool in accordance with a value of the operating variable stored in the operating variable storage area of the memory, wherein the operating variable is a selection within the designated operation type.

2. The method according to claim 1, further including:

receiving state data which varies in accordance with a state of a probe provided in the numerical control machine tool and storing the state data in a state data storage area of the memory; and generating data, which can be read by a data processor for the three-dimensional measuring device based on a value of the state data stored in the state data storage area of the memory.

3. A non-transitory computer readable medium storing a program causing a controller to execute a control process of a numerical control machine tool, the control process comprising:

generating, based on an instruction for controlling a three-dimensional measuring device different from the numerical control machine tool, a flag which designates an operation type of the numerical control machine tool and an operating variable for controlling an operation of the numerical control machine tool;

storing the flag in a flag storage area of a memory and storing the operating variable in an operating variable storage area of the memory;

selecting an operation to be executed by the numerical control machine tool by referring to a value of the flag stored in the flag storage area of the memory; and executing a control of the selected operation of the numerical control machine tool in accordance with a value of the operating variable stored in the operating variable storage area of the memory, wherein the operating variable is a selection within the designated operation type.

4. A controller which controls a numerical control machine tool, comprising:

a generator configured to generate, based on an instruction for controlling a three-dimensional measuring device different from the numerical control machine tool, a flag which designates an operation type of the numerical control machine tool and an operating variable for controlling an operation of the numerical control machine tool;

a memory configured to store the flag in a flag storage area and to store the operating variable in an operating variable storage area;

a processor configured to select an operation to be executed by the numerical control machine tool by referring to a value of the flag stored in the flag storage area of the memory, and configured to execute a control of the selected operation of the numerical control machine tool in accordance with a value of the operating variable stored in the operating variable storage area of the memory, wherein the operating variable is a selection within the designated operation type.

* * * * *